(12) United States Patent
Takikura et al.

(10) Patent No.: US 6,431,483 B2
(45) Date of Patent: Aug. 13, 2002

(54) SPINNING REEL SPOOL

(75) Inventors: Koji Takikura, Izumi; Yoshiyuki Furomoto, Kishiwada, both of (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/884,088

(22) Filed: Jun. 20, 2001

(30) Foreign Application Priority Data

Jun. 26, 2000 (JP) ........................................ 2000-190665

(51) Int. Cl.⁷ .............................................. A01K 89/01
(52) U.S. Cl. ...................................... 242/322; D22/140
(58) Field of Search ................................ 242/224, 322; D22/140, 141, 137

(56) References Cited

U.S. PATENT DOCUMENTS

| | | | | |
|---|---|---|---|---|
| 4,222,534 A | * | 9/1980 | Ishida | 242/322 |
| 5,603,465 A | * | 2/1997 | Henriksson | 242/322 |
| 5,697,467 A | * | 12/1997 | Sonenvald | 242/322 |
| 5,785,266 A | * | 7/1998 | Bowersox | 242/322 |
| 5,947,400 A | * | 9/1999 | Tsutsumi | 242/322 |
| 6,164,577 A | * | 12/2000 | Koike | 242/322 |
| 6,164,578 A | * | 12/2000 | Tsutsumi | 242/322 |
| 6,311,914 B1 | * | 11/2001 | Tsutsumi | 242/322 |

* cited by examiner

*Primary Examiner*—Emmanuel M. Marcelo
(74) *Attorney, Agent, or Firm*—Shinjyu Global IP Counselors, LLP (57) ABSTRACT

Spinning reel spool in which fishing line is unlikely to get jammed in between the bobbin trunk and the flange. The spinning reel spool 4 includes a spool main 7 and a front flange 8 as its chief components. The spool main 7 includes a bobbin trunk 7a around which fishing line is wound, and a larger diameter tubular skirt 7b, formed unitarily with the rear end of the bobbin trunk 7a. The front flange 8 has a larger diameter than, and is attached to the front end of, the bobbin trunk 7a. The bobbin trunk 7a includes a tubular section 7c and an inner barrel 7d made of synthetic resin, attached inner circumferentially to the tubular section 7c. Fitted between the front end of the inner barrel 7d and the front flange 8A is a reinforcement 70 made of metal. The reinforcement 70 is for example an annular, plate-form ring element made of metal, such as a washer.

21 Claims, 10 Drawing Sheets

SPINNING REEL SPOOL

BACKGROUND OF THE INVENTION

1. Technical Field

The present invention relates to spools, and in particular to spinning reel spools that reciprocate with respect to the reel unit.

2. Description of Related Art

Typical spinning reels include a reel unit, a rotor, a spool, and a handle that is rotatively supported on the reel unit. The spinning reel spool, which reciprocates with respect to the reel unit, comprises: a bobbin trunk onto which fishing line is wound; a front flange disposed on the front end of, and having a larger diameter than, the bobbin trunk; and a skirt having a rear flange, provided on the rear of the bobbin trunk. The skirt rear flange is furnished either separately from or unitarily with the bobbin trunk. The front flange is fastened with a front-flange fastening member to the bobbin trunk.

Among spools of this sort, ones in which the bobbin trunk is, for example, formed of synthetic resin and ones in which it is formed of an aluminum alloy sheet metal, which serves to lighten the spool overall, are known. Also, the front flange should maintain the relative strength of the spinning reel and improve the gliding of the fishing line. Therefore, some front flanges are formed by an element that is a different material, separate from the bobbin trunk.

In the aforementioned conventional spools made from synthetic resin, the relative strength of the bobbin trunk is in general liable to deteriorate. The bobbin trunk relative strength in spools formed from sheet metal also is liable to deteriorate since the sheet thickness is made thin. Deterioration thus in the bobbin trunk relative strength, when for example strong pressing force is applied to the bobbin trunk by winding on fishing line, may end up deforming the bobbin trunk. When the bobbin trunk, in particular the front end of the bobbin trunk, is deformed this way, a gap is created between the bobbin trunk and the front flange, since the front flange is a separate element from the bobbin trunk. This risks fishing line getting jammed in the gap.

Furthermore, in spools in which the skirt is furnished separately from the bobbin trunk, since the rear flange is separate from the bobbin trunk, a gap arises between the bobbin trunk and the rear flange, and there is the possibility that fishing line gets jammed in the gap.

SUMMARY OF THE INVENTION

An object of the present invention is in spinning reel spools to make it unlikely that fishing line jams in between the bobbin trunk and the flange.

According to a first aspect of the present invention, a spinning reel spool that can be shifted back and forth with respect to a reel unit, includes a tubular bobbin trunk for winding fishing line around its circumference, a flange attached to one end of the bobbin trunk, and a reinforcement provided on the same side of the bobbin trunk as the flange.

In such a spool, a reinforcement is provided on the same side of the bobbin trunk as the flange, so that it is possible to prevent deformations of the bobbin trunk when a strong pressure is exerted on the end of the bobbin trunk. Consequently, a gap between the flange and the bobbin trunk is formed less easily, and it is possible to prevent the fishing line from getting tuck in such a gap.

According to a second aspect of the present invention, in a spool as in the first aspect, the flange is a front flange attached to a front end of the bobbin trunk. With this configuration, it is possible to prevent the fishing line from getting jammed between the front flange and the bobbin trunk.

According to a third aspect of the present invention, a spool as in the first or second aspect further includes a skirt attached to a rear end of the bobbin trunk, and the flange is a rear flange provided at the skirt and attached to a rear end of the bobbin trunk. With this configuration, it is possible to prevent the fishing line from getting jammed between the rear flange and the bobbin trunk.

According to a fourth aspect of the present invention, in a spool as in any of the first to third aspects, the reinforcement is a metal ring. With this configuration, high strength can be attained at low cost by using for example a commonly used ring-shaped, flat component, such as a washer.

According to a fifth aspect of the present invention, in a spool as in any of the first to fourth aspects, the bobbin trunk is made of synthetic resin. With this configuration, the reinforcement strengthens the bobbin trunk, even when a bobbin trunk made of synthetic resin with low relative strength is used.

According to a sixth aspect of the present invention, in a spool as in any of the first to fifth aspects, the bobbin trunk comprises a cylindrical portion made of sheet metal, and an inner cylindrical member made of synthetic resin fitted into the cylindrical portion. With this configuration, an inner cylindrical member made of synthetic resin is fitted into a bobbin trunk made from sheet metal, and the reinforcement is attached to the inner cylindrical member. Thus, the reinforcement reinforces the relative strength of the inner cylindrical member.

According to a seventh aspect of the present invention, in a spool as in the sixth aspect, the reinforcement is arranged between the flange and an edge of the inner cylindrical member. With this configuration, it is possible to reinforce the relative strength of the edge of the inner cylindrical member in particular.

According to an eighth aspect of the present invention, in a spool as in the sixth aspect, the reinforcement is formed unitarily with the cylindrical portion, and an edge of the cylindrical portion is extended inwards. With this configuration, it is possible to reinforce the strength of the bobbin trunk by forming for example a cylindrical inner flange provided with a bottom at the end of the bobbin trunk.

According to a ninth aspect of the present invention, in a spool as in any of the first to eighth aspects, the reinforcement is formed unitarily with the flange, and the inner edge of the flange is extended inwards. With this configuration, it is possible to reinforce the strength of the bobbin trunk by forming for example a cylindrical inner flange provided with a bottom unitarily with the flange.

According to a tenth aspect of the present invention, in a spool as in any of the first to ninth aspects, the reinforcement is an engaged portion provided at the flange and engaged with an engagement portion provided at one end of the bobbin trunk. With this configuration, it is possible to reinforce the relative strength of the flange with respect to the bobbin trunk by engaging an engagement portion of the bobbin trunk with an annular engaged portion formed in the flange, for example.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
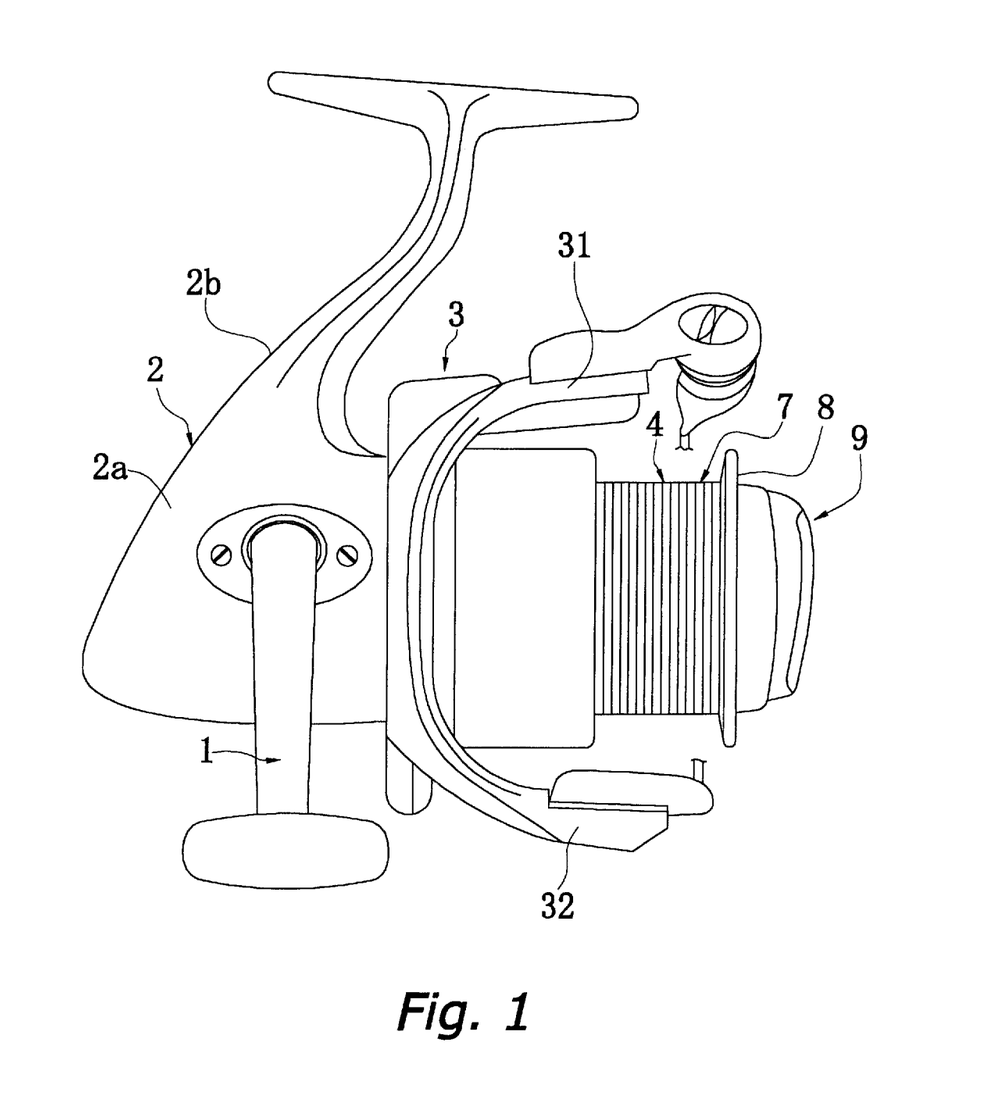
FIG. 1 is a right-side view of a spinning reel in accordance with one embodiment of the present invention.

As shown in FIG. 1, a spinning reel in accordance with an embodiment of the present invention includes a reel unit 2, a rotor 3, a spool 4, and a handle 1 that is rotatively supported by the reel unit 2. The rotor 3 is rotatively supported on the front of the reel unit 2. The fishing line is wound around the outer peripheral surface of the spool 4, which is disposed on the front of the rotor 3 and is reciprocating, i.e., is back-and-forth shiftable.

Figure 2:
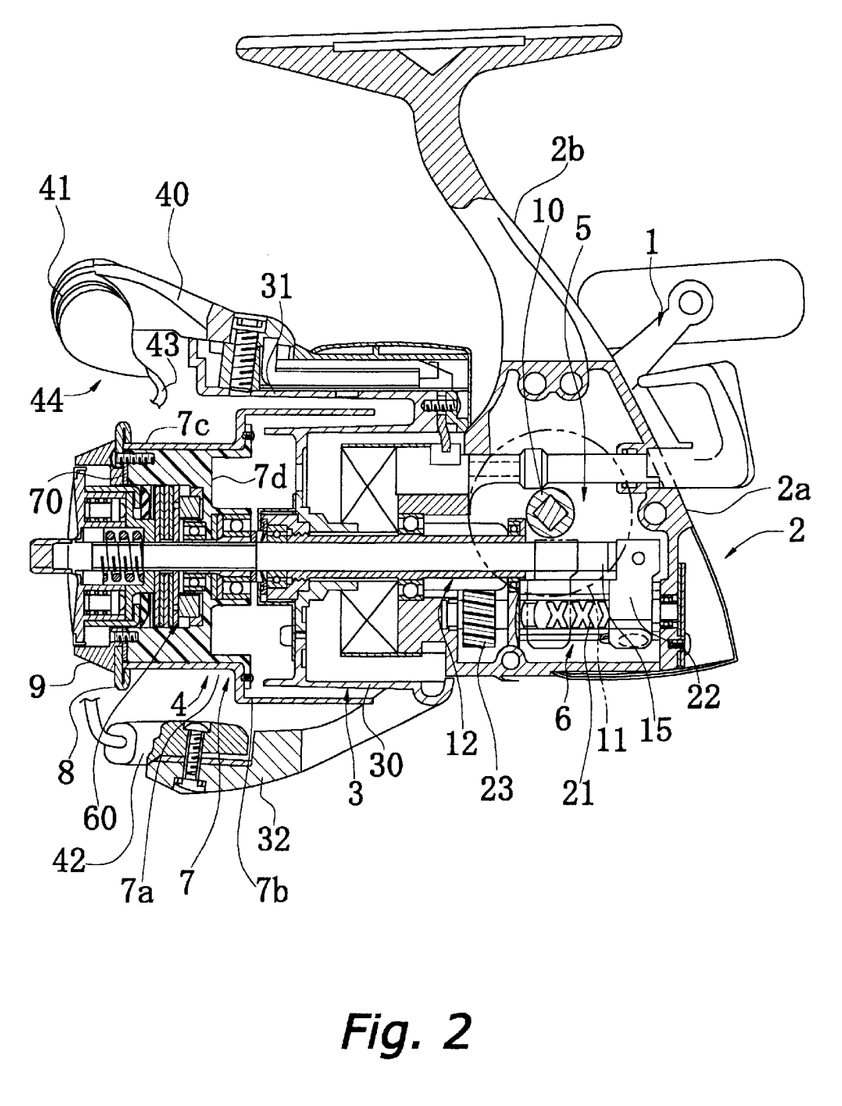
FIG. 2 is a left-side, partly in section view of the FIG. 1 spinning reel.

The reel unit 2 includes a reel body 2a and a rod attachment leg 2b extending diagonally upward to the front from the reel body 2a. As shown in FIG. 2, the reel body 2a has an interior space, which accommodates a rotor driving mechanism 5 and an oscillation mechanism 6. The rotor driving mechanism 5 transmits the rotation of the handle 1 to rotate the rotor 3. The oscillating mechanism 6 is for winding on fishing line uniformly by reciprocating the spool 4.

The rotor driving mechanism 5 includes a face gear 11 and a pinion gear 12. The face gear 11 rotates together with a handle shaft 10 to which the handle 1 is fixed. The pinion gear 12 meshes with the face gear 11. The pinion gear 12 is tubular. Its front portion penetrates the center of the rotor 3, and is fixed with a nut to the rotor 3. The middle and the rear end of the pinion gear 12 are rotatively supported by bearings in the reel unit 2.

The oscillating mechanism 6 reciprocates the spool shaft 15, which is linked to the middle portion of the spool 4 via a drag mechanism 60, thereby also reciprocating the spool 4. The oscillating mechanism 6 includes a threaded shaft 21, a slider 22, and an intermediate gear 23. The threaded shaft 21 is disposed paralleling the spool shaft 15 beneath it. The slider 22 moves back and forth along the threaded shaft 21, to the front end of which the intermediate gear 23 is fixed. The rear end of the spool shaft 15 is fixed non-rotatively to the slider 22. The intermediate gear 23 meshes with the pinion gear 12.

As shown in FIG. 2, the rotor 3 includes a cylindrical portion 30, and first and second rotor arms 31 and 32, which are disposed in opposition to one another at the sides of the cylindrical portion 30. The cylindrical portion 30 and the two rotor arms 31 and 32 can be made, for example, of an aluminum alloy, and are formed unitarily.

The first rotor arm 31 extends forward in a curve protruding from the cylindrical portion 30 to the outside, and the portion where the first rotor arm 31 is connected to the cylindrical portion 30 describes a curve that widens in the circumferential direction of the cylindrical portion 30. A pivotable first bail support member 40 is provided on the outer peripheral side of the tip of the first rotor arm 31. A line roller 41 for guiding the fishing line to the spool 4 is disposed at the end of the first bail support member 40.

The second rotor arm 32 extends forward in a curve protruding outward from the cylindrical portion 30. From the tip portion to the portion where the second rotor arm 32 is connected to the cylindrical portion 30, the second rotor arm 32 splits into two legs that are connected in two circumferentially spaced locations to the cylindrical portion 30. A pivotable second bail support member 42 is provided on the inner peripheral side of the tip of the second rotor arm 32.

A bail 43 formed by bending a filament into an approximate U-shape is fixed between the line roller 41 and the second bail support member 42. The first and second bail support members 40 and 42, the line roller 41 and the bail 43 constitute a bail arm 44 guiding the fishing line to the spool 4. The bail arm 44 is pivotable between a line-winding position shown in FIG. 2 and an antagonistic line-release position.

Figure 3:
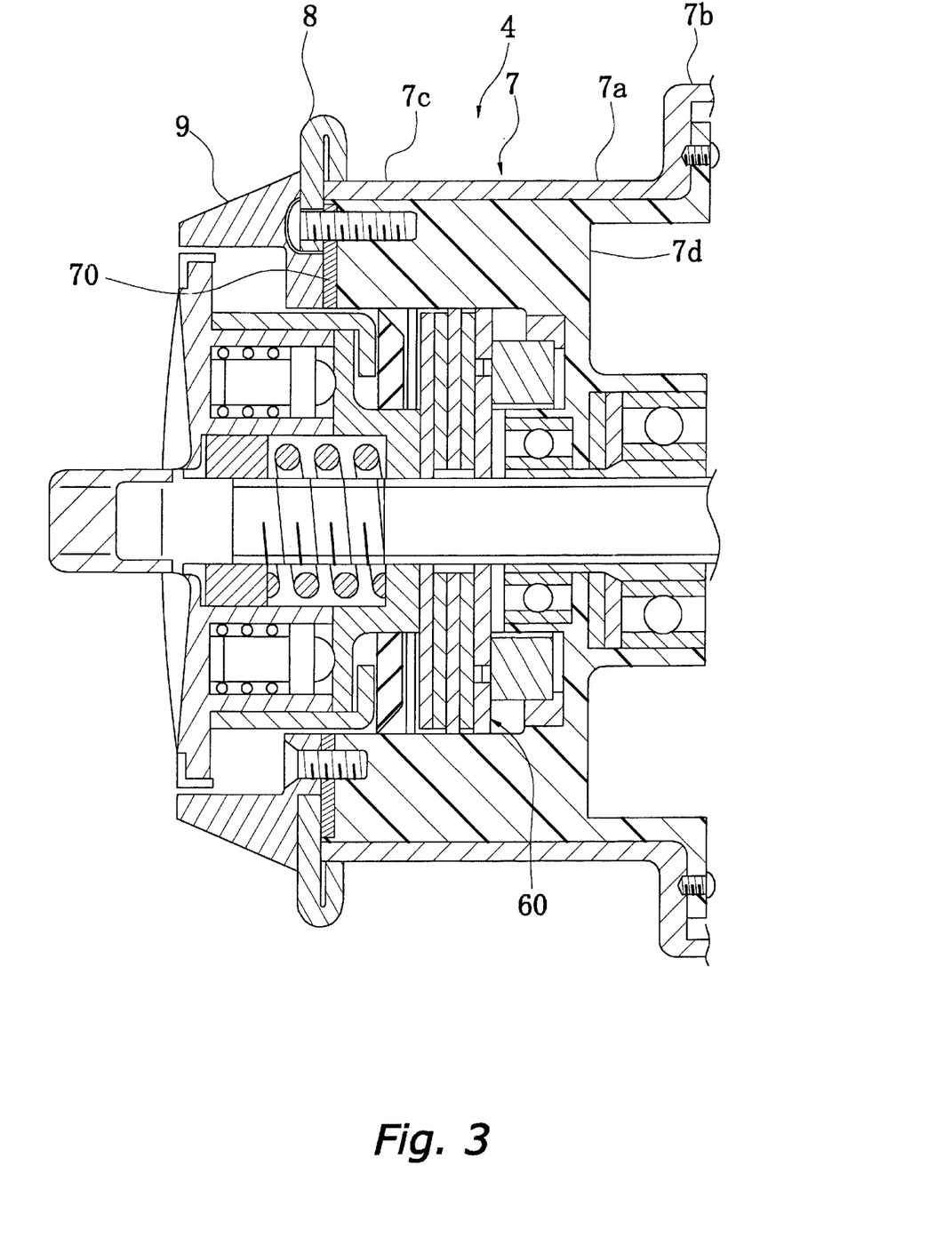
FIG. 3 is a fragmentary section view enlarged from FIG. 2 to show details of the spool.

The spool 4 is arranged between the first rotor arm 31 and the second rotor arm 32 of the rotor 3, and is disposed at the end of the spool shaft 15 with the drag mechanism 60 interposed between the spool shaft 15 and the spool 4. The spool 4 includes a spool main 7, a front flange 8, and a front-flange fastening member 9. The spool main 7 includes a bobbin trunk 7a around which the fishing line is wound, and a larger-diameter tubular skirt 7b formed unitarily with the rear end of the bobbin trunk 7a. The front flange 8 has a larger diameter than, and is attached to the front end of, the bobbin trunk 7a. The front-flange fastening member 9 fastens the front flange 8 to the spool main 7. A metal reinforcement 70 is disposed between the front end of an inner barrel 7d and the front flange 8.

The bobbin trunk 7a includes a tubular section 7c made by press-forming a sheet of aluminum alloy, and an inner barrel 7d made of a synthetic resin that is fitted inside the tubular section 7c. The tubular section 7c and the skirt 7b form a larger/smaller dual-stage tubular member obtained through unitarily molding a sheet of aluminum alloy by press-forming.

The inner barrel 7d is fitted to the inner circumference of the tubular section 7c, and is a cylindrical piece of synthetic resin, to which the drag mechanism 60 is attached. Female threaded holes for screwing fast the front flange 8 and the front-flange fastening member 9 are formed at a plurality of locations in the front end of the inner barrel 7d.

The front flange 8 is an annular member made of a stainless alloy that has been subjected to a curling process and folded over to the rear. The front flange 8 is fastened by screwing it to the inner barrel 7d.

The front-flange fastening member 9 is fastened with screws to the inner barrel 7d, so that the front flange 8 is held between the front-flange fastening member 9 and the front end of the bobbin trunk 7a. The female threaded holes in the front-flange fastening member 9 are arranged at different positions than the female holes of the front flange 8.

The reinforcement 70 is, for example, a ring-shaped, plate-form ring member made of metal, such as a washer. Through-holes connecting the female threaded holes in the inner barrel 7d, the front flange 8, and the front-flange fastening member 9 are formed at a plurality of locations in the reinforcement 70.

In this spool 4, a metal reinforcement 70 is attached to the inner barrel 7d, so that the relative strength of the inner barrel 7d is reinforced. Consequently, deformations of the bobbin trunk 7a are restrained, so that the fishing line is unlikely to get jammed in between the bobbin trunk 7a and the front flange 8.

Other Embodiments (a) In the foregoing principal embodiment, the reinforcement is fastened with screws to the inner barrel. However, the invention is not thus limited, and the reinforcement may also be fastened by press fitting, gluing, welding or any other suitable method.

Figure 4:
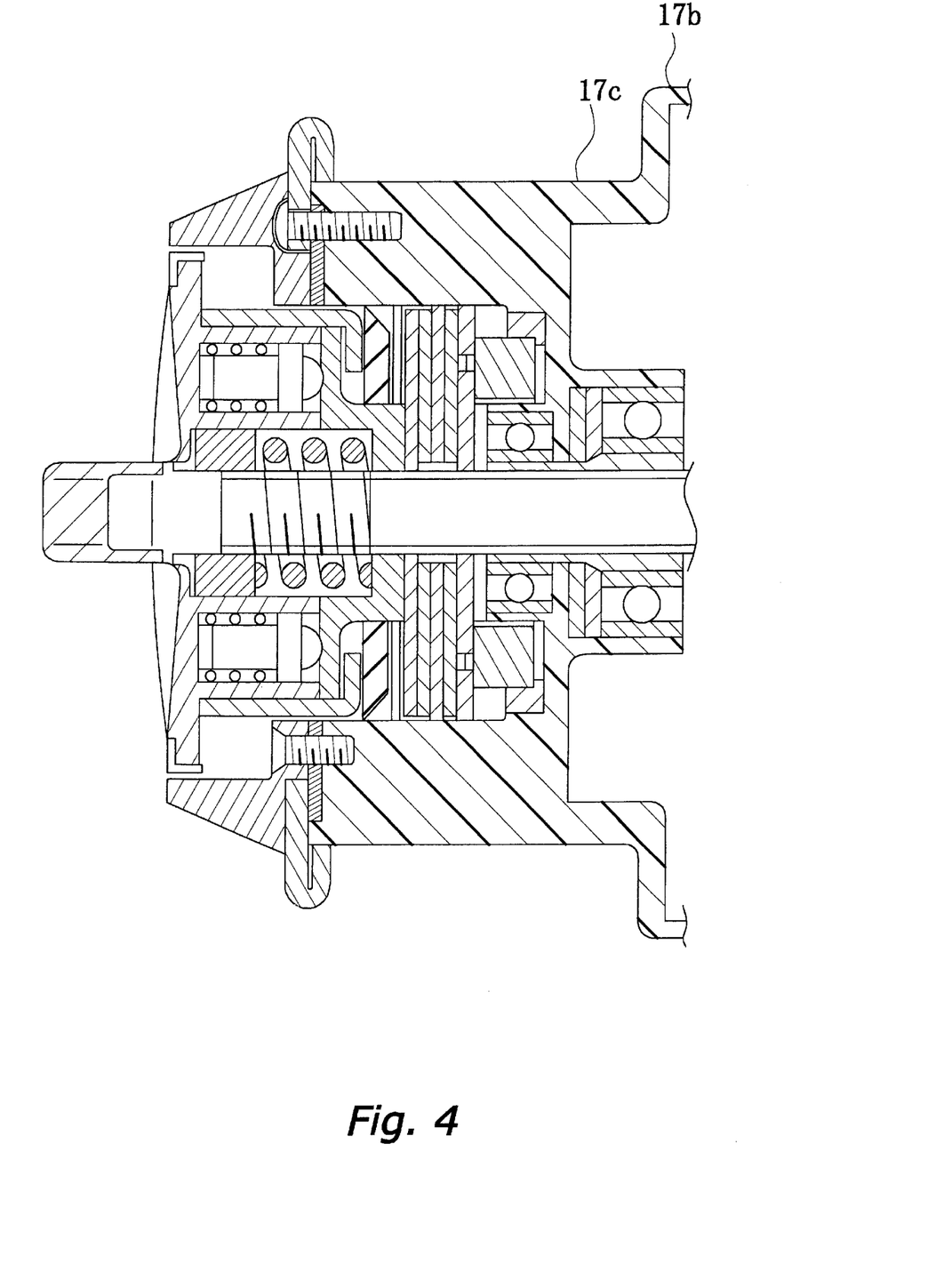
FIG. 4 is a view corresponding to FIG. 3, illustrating another embodiment.

(b) In the foregoing principal embodiment, the bobbin trunk includes a tubular section made by press-forming a sheet of aluminum alloy, and separately formed inner barrel made of synthetic resin. However, a bobbin trunk 17a made of synthetic resin may also be formed unitarily with a skirt 17b, as shown in FIG. 4.

Figure 5:
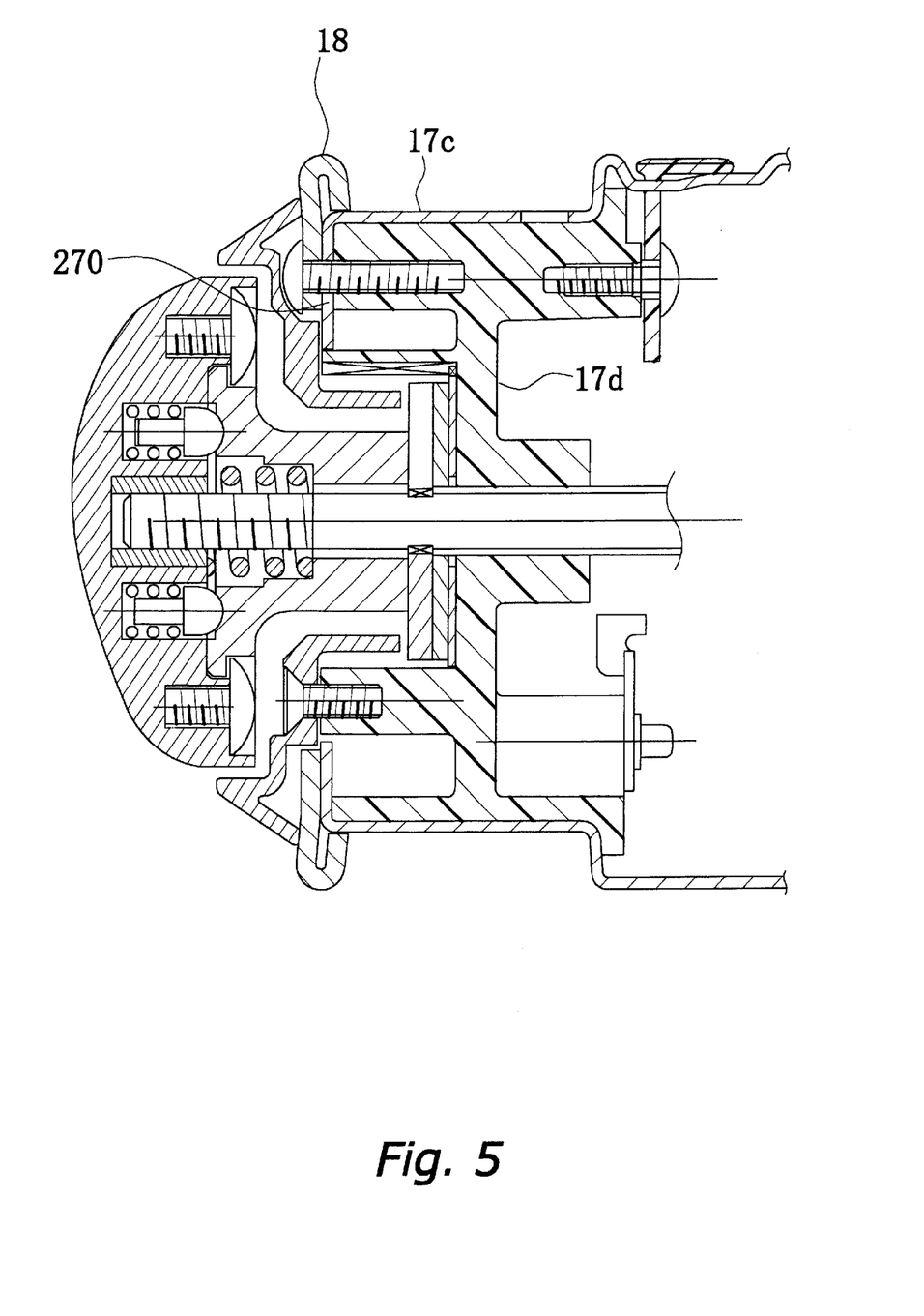
FIG. 5 is a view essentially corresponding to FIG. 3, but of a slightly different spool.

(c) In the foregoing principal embodiment, the reinforcement is formed separately from the bobbin trunk, but it may also be formed unitarily with the bobbin trunk. As shown in FIG. 5 for example, a reinforcement 270 may also be an inner flange 7e formed by bending and extending the front end of tubular section 17c inward circumferentially. The inner flange 7e can be press-formed and bent inwards, in contact with the front end of the inner barrel 17d, and held between the front end of the inner barrel 17d and front flange 18.

(d) In the foregoing principal embodiment, the reinforcement is provided between the front end of the bobbin trunk and the front flange, but the invention is not thus limited, and the metal reinforcement may be press fit frontward into a synthetic resin bobbin trunk at a position removed from the front flange 8.

Figure 6:
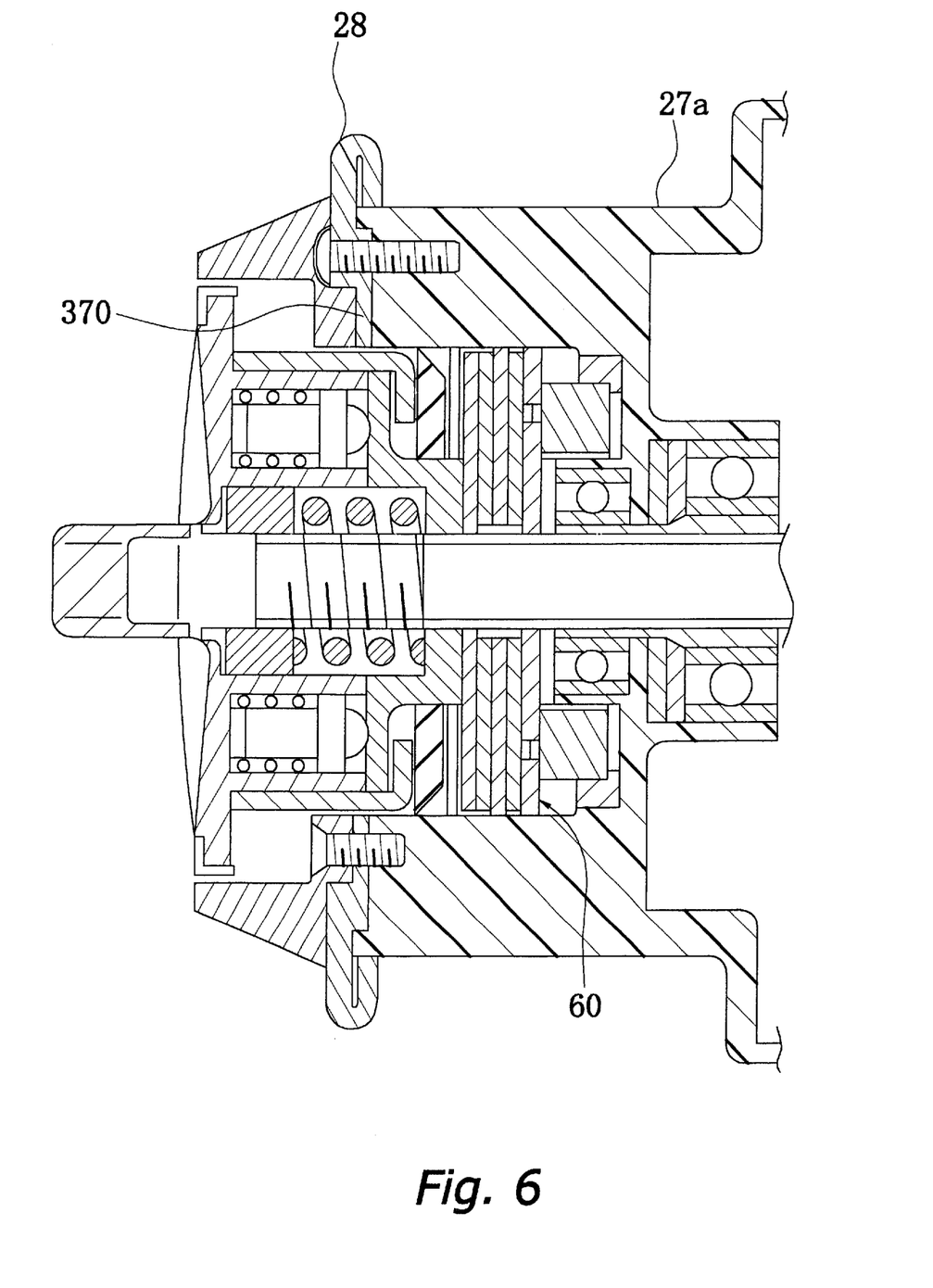
FIG. 6 through 8 are each views corresponding to FIG. 3, each illustrating respective other embodiments.

(e) As shown in FIG. 6, a tubular reinforcement 370 provided on a front flange 28 may be press fit into the front-end inner margin of a bobbin trunk 27a made of synthetic resin. In the portion where the bent over part of the front flange 28 is joined to the bobbin trunk 27a, the front flange 28 and the bobbin trunk 27a each are approximately flat, making damage unlikely despite fishing line contacting on them.

Figure 7:
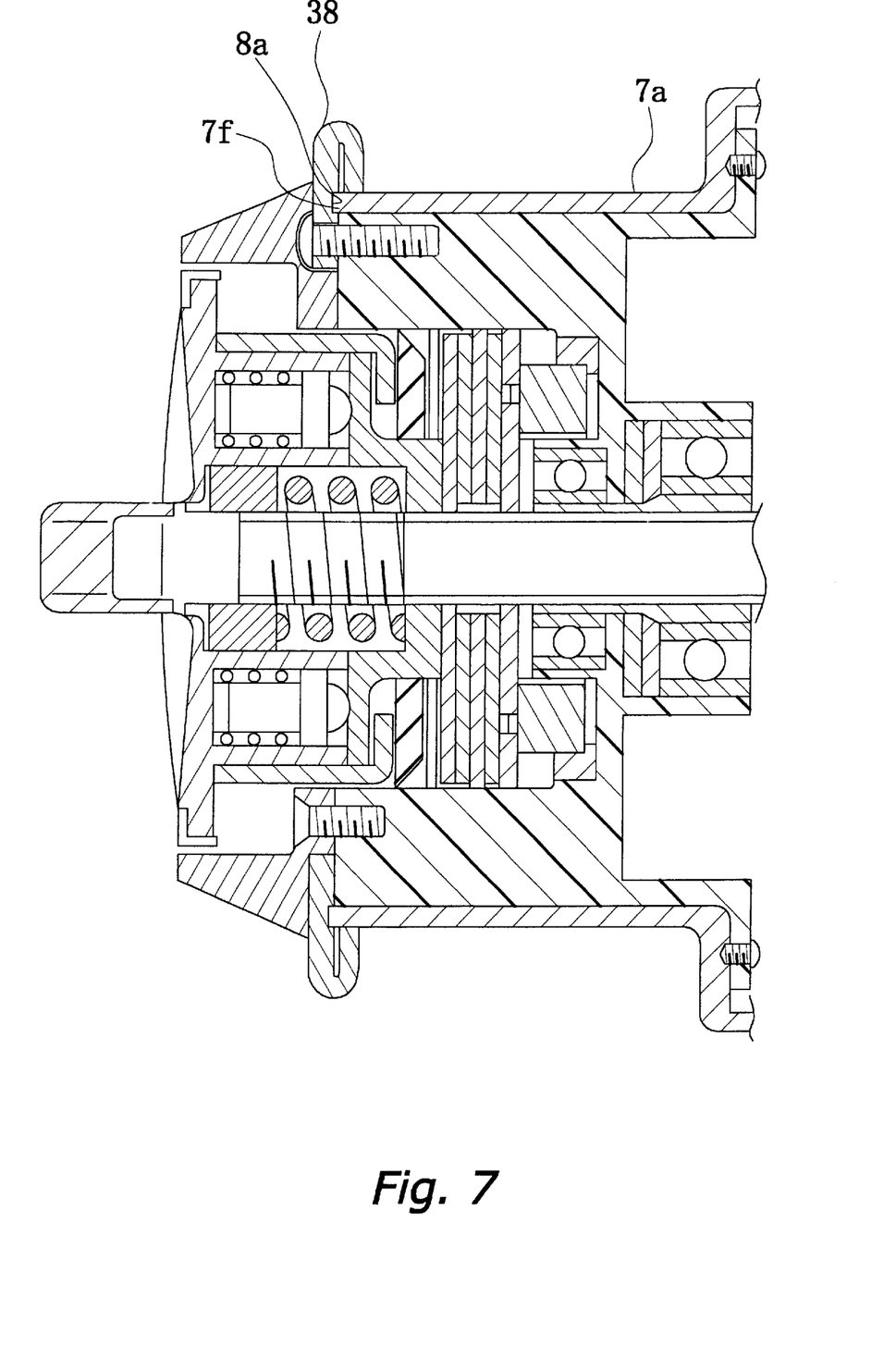
Figure 8:
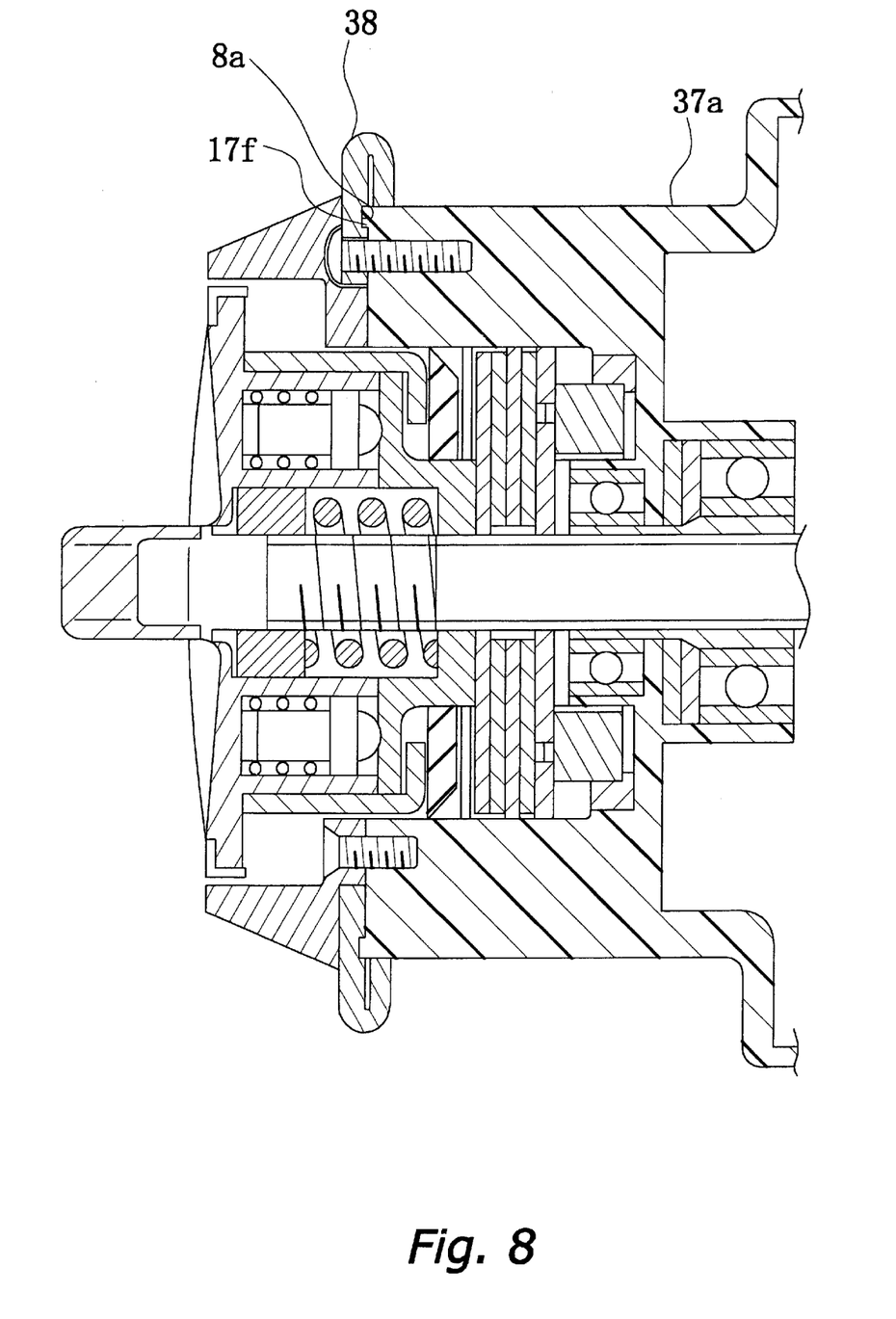

(f) As shown in FIG. 7, the reinforcement may also be a plate-shaped portion of the front flange 38 having a ring-shaped engaged portion 8a, into which an engaging portion 7f provided on the front end of the bobbin trunk 7a engages. Furthermore, as shown in FIG. 8 an engagement portion 17f on a synthetic resin bobbin trunk 37a may engage with an engagement portion 8a formed on a plate-shaped portion (the reinforcement) of the front flange 38.

Figure 9:
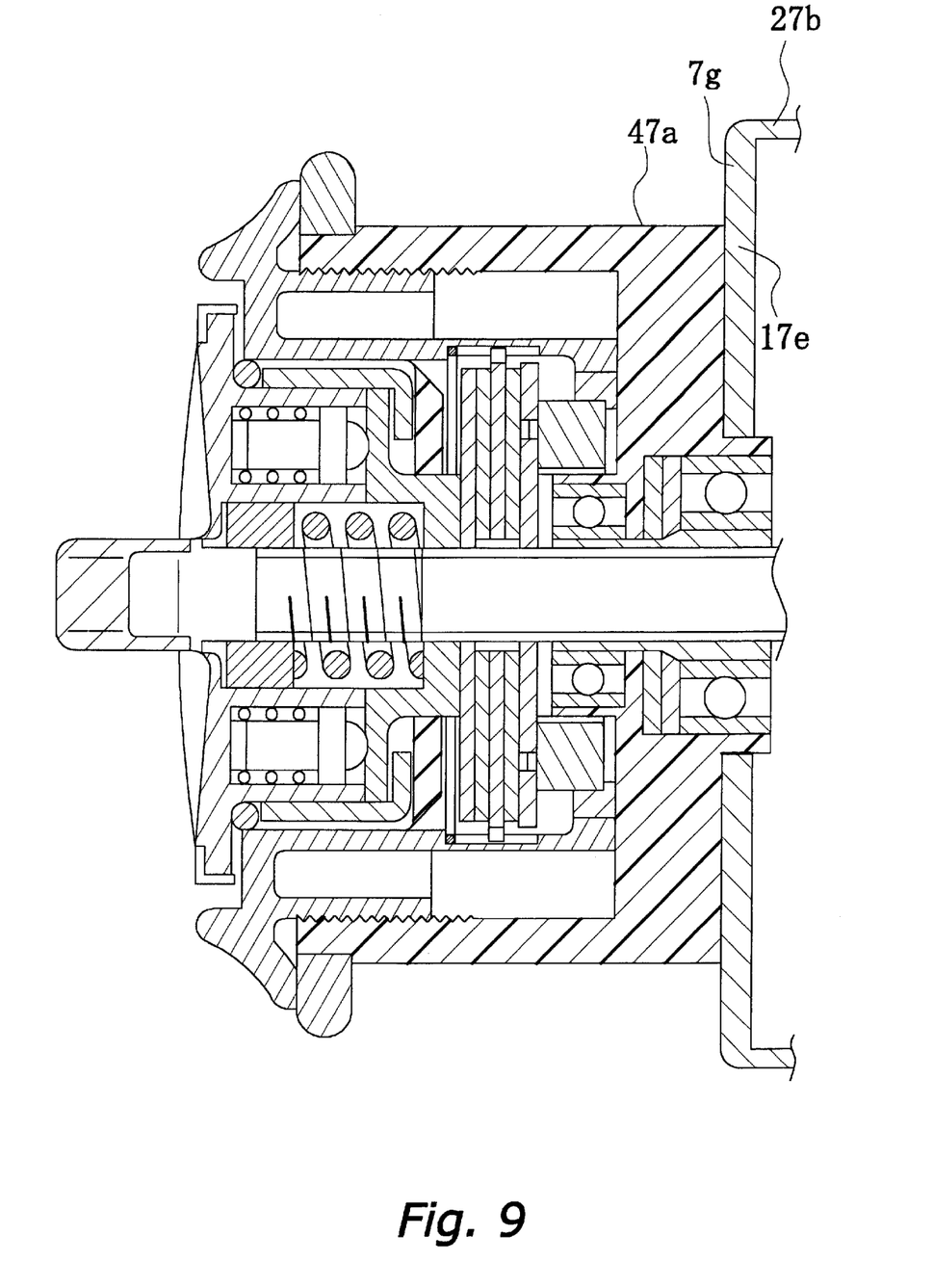
FIG. 9 and 10 are views essentially corresponding to FIG. 3, but of a slightly different spool, each illustrating respective other embodiments.
Figure 10:
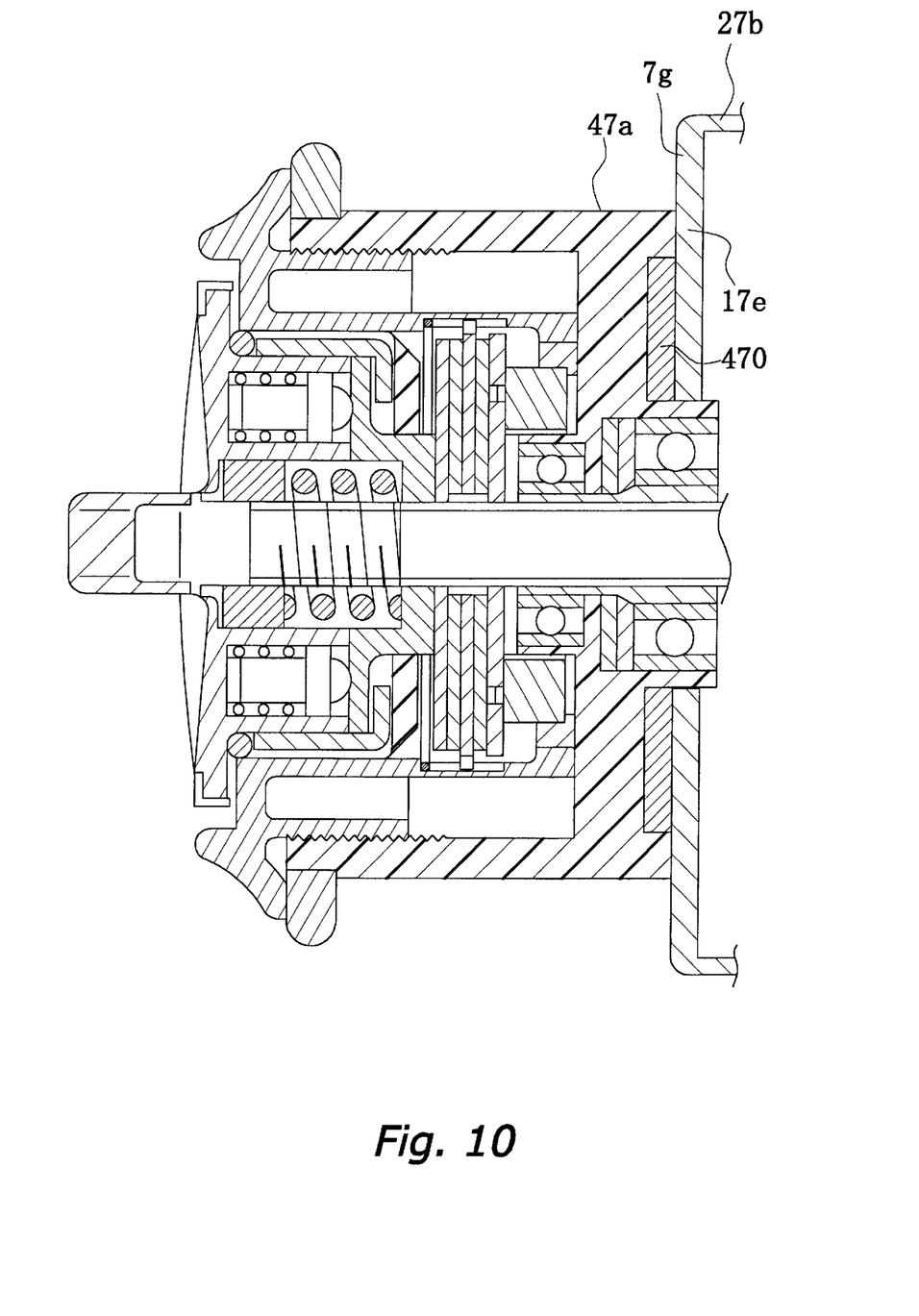

(g) As shown in FIG. 9, a skirt 27b having a rear flange 7g may be provided separately from a bobbin trunk 47a, where the reinforcement may be a plate-shaped inner flange 17e extending inward circumferentially from the inner rim of the rear flange 7g and formed unitarily therewith. And as shown in FIG. 10, it is also possible to provide a reinforcement 470 separately from the rear flange 7g at the rear end of the bobbin trunk 47a.

In accordance with the present invention, a reinforcement is attached to the flange attachment side of the bobbin trunk of a spinning reel spool, thereby strengthening the bobbin trunk to curb bobbin trunk deformation. Consequently, fishing line is less likely to jam in between the bobbin trunk and the flange.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning reel spool for reciprocating with respect to a reel body, the spinning reel spool comprising:
   a tubular bobbin trunk outer peripherally onto which fishing line is wound;
   a flange portion attached to at least one end of said bobbin trunk; and
   reinforcement means provided on a side of said bobbin trunk to which said flange portion is attached for reinforcing said bobbin trunk by preventing deformation of the side of said bobbin trunk.

2. The spinning reel spool as set forth in claim 1, wherein said flange portion includes a front flange portion attached to a front end of said bobbin trunk.

3. The spinning reel spool as set forth in claim 1, further comprising
   a skirt portion attached to a rear end of said bobbin trunk, said flange portion including a rear flange portion provided on said skirt portion and attached to the rear end of said bobbin trunk.

4. The spinning reel spool as set forth in claim 1, wherein said reinforcement means includes a metallic ring member.

5. The spinning reel spool as set forth in claim 1, wherein said bobbin trunk is made of synthetic resin.

6. The spinning reel spool as set forth in claim 1, wherein said reinforcement means includes a unitarily-formed portion of said flange portion that along its inner margin extends inward circumferentially.

7. The spinning reel spool as set forth in claim 1, wherein said reinforcement means includes an engaged portion provided on said flange portion for engagement with an engaging portion provided on the end of said bobbin trunk.

8. A spinning reel spool for reciprocating with respect to the reel body, said spinning reel spool comprising:
   a tubular bobbin trunk outer peripherally onto which fishing line is wound;
   a flange portion attached to an end of said bobbin trunk; and
   reinforcement means provided on the flange portion attachment side of said bobbin trunk,
   said bobbin trunk including a tubular portion formed from sheet metal, and an inner barrel member, made of synthetic resin and attached inner circumferentially to said tubular portion.

9. The spinning reel spool as set forth in claim 8, wherein said reinforcement means is installed in between said flange portion and the end of said inner barrel member.

10. The spinning reel spool as set forth in claim 8, wherein said reinforcement means includes a unitarily-formed portion of said tubular portion that extends inward circumferentially.

11. A spinning reel spool for reciprocating with respect to a reel body, the spinning reel spool comprising:

a tubular bobbin trunk outer peripherally onto which fishing line is wound;

a flange portion attached to at least one end of said bobbin trunk; and a reinforcement plate member provided on a side of said bobbin trunk to which said flange portion is attached for reinforcing said bobbin trunk by preventing deformation of the side of said bobbin trunk.

12. The spinning reel spool as set forth in claim 11, wherein said flange portion includes a front flange portion attached to a front end of said bobbin trunk.

13. The spinning reel spool as set forth in claim 11, further comprising a skirt portion attached to a rear end of said bobbin trunk; said flange portion including a rear flange portion provided on said skirt portion and attached to the rear end of said bobbin trunk.

14. The spinning reel spool as set forth in claim 11, wherein said reinforcement means includes a metallic ring member.

15. The spinning reel spool as set forth in claim 11, wherein said bobbin trunk is made of synthetic resin.

16. A spinning reel spool as set forth in claim 11, wherein said bobbin trunk includes a tubular portion formed from sheet metal, and an inner barrel member, made of synthetic resin-, and attached inner circumferentially to said tubular portion.

17. The spinning reel spool as set forth in claim 16, wherein said reinforcement plate member is installed in between said flange portion and the end of said inner barrel member.

18. The spinning reel spool as set forth in claim 16, wherein said reinforcement plate member includes a unitarily-formed portion that is formed unitarily with said tubular portion and extends inward circumferentially.

19. The spinning reel spool as set forth in claim 11, wherein said reinforcement plate member is formed unitarily with said flange portion.

20. The spinning reel spool as set forth in claim 19, wherein an inner margin of said flange portion extends inward circumferentially.

21. The spinning reel spool as set forth in claim 11, wherein said reinforcement plate member is disposed immediately adjacent said bobbin trunk.

* * * * *